(12) United States Patent
Satou et al.

(10) Patent No.: US 11,971,363 B2
(45) Date of Patent: Apr. 30, 2024

(54) FOREIGN MATTER INSPECTION SYSTEM AND FOREIGN MATTER INSPECTION METHOD

(71) Applicant: NIPRO CORPORATION, Osaka (JP)

(72) Inventors: Takuma Satou, Osaka (JP); Tadashi Kabutomori, Osaka (JP); Masamichi Takasugi, Osaka (JP)

(73) Assignee: NIPRO CORPORATION, Osaka (JP)

( * ) Notice: Subject to any disclaimer, the term of this patent is extended or adjusted under 35 U.S.C. 154(b) by 412 days.

(21) Appl. No.: 17/288,637

(22) PCT Filed: Oct. 25, 2019

(86) PCT No.: PCT/JP2019/041911
§ 371 (c)(1),
(2) Date: Apr. 26, 2021

(87) PCT Pub. No.: WO2020/090656
PCT Pub. Date: May 7, 2020

(65) Prior Publication Data
US 2021/0383531 A1    Dec. 9, 2021

(30) Foreign Application Priority Data
Oct. 31, 2018    (JP) .................................. 2018-205694

(51) Int. Cl.
*G01N 21/90*    (2006.01)
*G06T 7/00*    (2017.01)

(52) U.S. Cl.
CPC ......... *G01N 21/9027* (2013.01); *G01N 21/90* (2013.01); *G06T 7/0008* (2013.01);
(Continued)

(58) Field of Classification Search
CPC ............... G01N 21/9027; G01N 21/90; G01N 21/9081; G01N 21/9009; G01N 2201/02;
(Continued)

(56) References Cited

U.S. PATENT DOCUMENTS

2003/0041678 A1    3/2003    Hoshida et al.
2014/0250835 A1    9/2014    Prabhu et al.

FOREIGN PATENT DOCUMENTS

JP    01-155238 A    3/1989
JP    02-150752 A    6/1990
(Continued)

*Primary Examiner* — Edward F Urban
*Assistant Examiner* — Wassim Mahrouka
(74) *Attorney, Agent, or Firm* — Jordan and Koda, PLLC; Steven Koda, Esq.

(57) ABSTRACT

A foreign matter inspection system that is less likely to misidentify a crack as a foreign matter during an image inspection in which a vibration is applied to a powder contained in a bag-like container. The foreign matter inspection system includes a vibration device configured to apply a vibration to a container, a photography device configured to optically photograph the inside of the container through a transparent area, and a determination device configured to determine whether a foreign matter is present inside the container based on an image of the container photographed by the photography device. The vibration device alternately applies weak vibrations W and strong vibrations S to the container. The determination device determines whether the foreign matter is present inside the container based on the image of the container photographed by the photography device when the vibration device applies the weak vibrations W.

9 Claims, 3 Drawing Sheets

(52) U.S. Cl.
CPC .............................. *G01N 2201/02* (2013.01); *G06T 2207/30112* (2013.01); *G06V 2201/03* (2022.01)

(58) Field of Classification Search
CPC ........ G06T 7/0008; G06T 2207/30112; G06V 2201/03
See application file for complete search history.

(56) References Cited

FOREIGN PATENT DOCUMENTS

| | | | |
|---|---|---|---|
| JP | 03-051748 | A | 3/1991 |
| JP | 2000-298103 | A | 10/2000 |
| JP | 2001-004549 | A | 1/2001 |
| JP | 2003-166939 | A | 6/2003 |
| JP | 2010-008339 | A | 1/2010 |
| JP | 2014-006186 | A | 1/2014 |
| JP | 2014006186 | A * | 1/2014 |
| JP | 2014145652 | A * | 8/2014 |
| JP | 2014145652 | A | 8/2014 |

\* cited by examiner

FOREIGN MATTER INSPECTION SYSTEM AND FOREIGN MATTER INSPECTION METHOD

BACKGROUND OF THE INVENTION

The present invention relates to a foreign matter inspection system and a foreign matter inspection method for inspecting whether a foreign matter is present inside a bag-like container in which a powder is sealed and which has an area where the powder is visible from the outside.

Conventionally, as a form in which powdered pharmaceuticals, such as injections, powdered medicines, fine granules, and granules, are packaged, a bag-like container having an area where a powder is visible from the outside is mentioned. As an inspection for the presence of a foreign matter in the powder contained in the container, a visual inspection and an inspection performed by analyzing optically obtained image data are known (Patent Document 1). A foreign matter detecting device described in Patent Document 1 optically detects a foreign matter in a powder when a vibration is applied to a bag-like body containing the powder.

Patent Document 1: Japanese Patent Application Laid-Open No. 2001-4549

SUMMARY OF INVENTION

However, when the vibration is applied to the bag-like body, a crack is sometimes generated in a powder mass. Since this crack appears as a shadow in an image, the shadow is sometimes determined as the foreign matter when the image is analyzed. As a result, a product, which is actually a good product in which no foreign matter is present, may be determined to be a defective product in which the foreign matter is present.

The present invention has been made in view of the above-described circumstances. An object of the present invention is to provide a means that is less likely to misidentify a crack as a foreign matter during an image inspection in which a vibration is applied to a powder contained in a bag-like container.

(1) The present invention relates to a foreign matter inspection system inspecting whether a foreign matter is present inside a bag-like container in which a powder is sealed and which has an area where the powder is visible from the outside. The foreign matter inspection system includes a vibration device configured to apply a vibration to the container, a photography device configured to optically photograph the inside of the container through the area from the outside, and a determination device configured to determine whether the foreign matter is present inside the container based on an image of the container photographed by the photography device. The vibration device alternately applies a weak vibration and a strong vibration being a vibration stronger than the weak vibration to the container, and the determination device determines whether the foreign matter is present inside the container based on the image of the container photographed by the photography device when the vibration device applies the weak vibration.

By applying the strong vibration to the container, the foreign matter buried inside the powder appears so that the foreign matter can be photographed. Further, by applying the weak vibration to the container, a crack generated by the strong vibration is eliminated, the powder is less likely to be cracked, and the appearing foreign matter is less likely to disappear. By determining whether the foreign matter other than the powder is present inside the container based on the image obtained in the weak vibration, the determination accuracy of the foreign matter is improved.

(2) Preferably, the vibration device includes a rotating shaft and a hammer rotating in conjunction with the rotating shaft and colliding with the container, and is located on the opposite side to the photography device with the container interposed between the vibration device and the photography device.

(3) Preferably, the vibration device makes the number of rotations of the rotating shaft in the strong vibration higher than the number of rotations of the rotating shaft in the weak vibration.

According to the above-described configuration, the strong vibration and the weak vibration can be applied to the container by a simple configuration.

(4) Preferably, the determination device determines presence or absence of the foreign matter based on a range where the color density equal to or higher than a threshold value continues in the area in a monochrome image of the container.

(5) Preferably, the powder is a pharmaceutical agent.

(6) The present invention may be construed as a foreign matter inspection method for inspecting whether a foreign matter is present inside a bag-like container in which a powder is sealed and which has an area where the powder is visible from the outside, the method includes alternately applying a weak vibration and a strong vibration being a vibration stronger than the weak vibration to the container, photographing an image including the area of the container to acquire image data when the weak vibration is applied, and determining whether the foreign matter is present inside the container based on the acquired image data.

According to the present invention, it is less likely to misidentify a crack as the foreign matter during an image inspection in which the vibration is applied to the powder contained in the bag-like container.

DESCRIPTION OF EMBODIMENTS

Hereinafter, an embodiment of the present invention will be described with reference to the drawings as appropriate. It is a matter of course that the embodiment described below is merely an example of the present invention, and the embodiment of the present invention can be appropriately modified without changing the gist of the present invention. In the following description, a vertical direction 5 is defined based on the top and the bottom, a forward and backward direction 6 (direction perpendicular to the sheet surface of FIG. 2) is defined in a direction perpendicular to the vertical direction 5, and a left and right direction 7 is defined in a direction perpendicular to each of the vertical direction 5 and the forward and backward direction 6.

Figure 1:
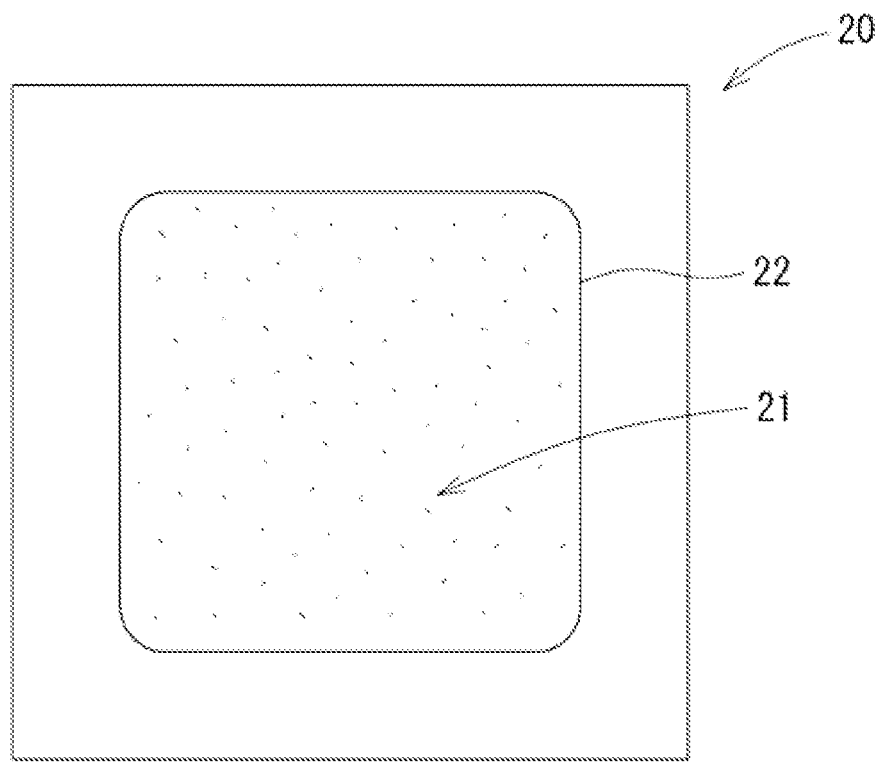
FIG. 1 is a plan view of a container 20.

As illustrated in FIG. 1, an object to be inspected by a foreign matter inspection system 10 described later is a container 20 in which a powder 21 is contained. The powder 21 is a pharmaceutical agent, such as injections, powdered medicines, fine granules, and granules. The pharmaceutical agents are not particularly limited, and, for example, cell wall synthesis inhibitor antibiotics, cell membrane inhibitor antibiotics, nucleic acid synthesis inhibitor antibiotics, protein synthesis inhibitor antibiotics, folic acid metabolic pathway inhibitor antibiotics, β-lactamase inhibitor, sulfa drugs, and anti-infective drugs are preferable. Examples of the pharmaceutical agents include ampicillin, bacampicillin, amoxicillin, pivmecillinam, amoxicillin, sultamicillin, piperacillin, aspoxicillin, benzylpenicillin, cloxacillin, oxacillin, carbenicillin, cefaclor, cefroxadine, cefadroxil, cefixime, cefteram pivoxil, cefuroxime axetil, cefpodoxime proxetil, cefotiam hexetil, cefdinir, ceftibuten, cefditoren pivoxil, cefcapene pivoxil, cefazolin, cefozopran, cefmetazole, cefotiam, cefsulodin, cefoperazone, cefotaxime, cefmenoxime, ceftriaxone, ceftazidime, cefodizime, cefpirome, cefepime, faropenem, imipenem, panipenem, meropenem, biapenem, doripenem, aztreonam, vancomycin, teicoplanin, fosmicin, polymixin B sulfate, colistin sulfate, gramicidin S, amphotericin B, levofloxacin, ofloxacin, norfloxacin, enoxacin, ciprofloxacin, lomefloxacin, tosufloxacin, sparfloxacin, gatifloxacin, prulifloxacin, moxifloxacin, pazufloxacin, rifampicin, dibekacin, tobramycin, amikacin, isepamicin, micronomicin, streptomycin, kanamycin, gentamicin, erythromycin, rokitamycin, josamycin, roxithromycin, clarithromycin, azithromycin, telithromycin, doxycycline, minocycline, chloramphenicol, lincomycin, clindamycin, trimethoprim, clavulanic acid, sulbactam, tazobactam, sulfamethoxazole, salazopyrin, isoniazid, rifampicin, pyrazinamide, ethambutol, griseofulvin, amphotericin B, 5-fluorocytosine, fluconazole, miconazole, itraconazole, aciclovir, ganciclovir, foscavir, idoxuridine, amantadine, interferon γ, ribavirin, lamivudine, metronidazole, tinidazole, fluconazole, mebendazole, pyrantel pamoate, diethylcarbamazine, praziquantel, albendazole, ivermectin, quinupristin, dalfopristin, linezolid, spectinomycin, netilmicin, sisomycin, lincosamin, ramoplanin, telithromycin, nystatin, fusidic acid, chlorhexidine, polyhexanide, and the like.

As the properties of the powder 21 that is easily cracked by the application of a vibration, the angle of repose, the particle size, and the filling amount can be mentioned, for example. The angle of repose of the powder 21 is relatively low and specifically less than 46° and preferably less than 43°. The particle size of the powder 21 is large, and specifically the average particle size is 60 μm or more and preferably 85 μm or more. The filling amount of the powder 21 contained in the container 20 is at least 1 g or more, and even when the filling amount is large, the powder 21 can be inspected by the foreign matter inspection system 10.

The container 20 has a rectangular bag shape in a plan view, capable of containing the powder 21 therein. The container 20 is formed by thermally fusion-bonding laminate sheets obtained by laminating of a plurality of synthetic resin sheets, for example. In one surface of the bag-like container 20, a transparent area 22 is formed. The transparent area 22 is formed of a transparent resin sheet. The powder 21 contained in the internal space is visible through the transparent area 22.

Figure 2:
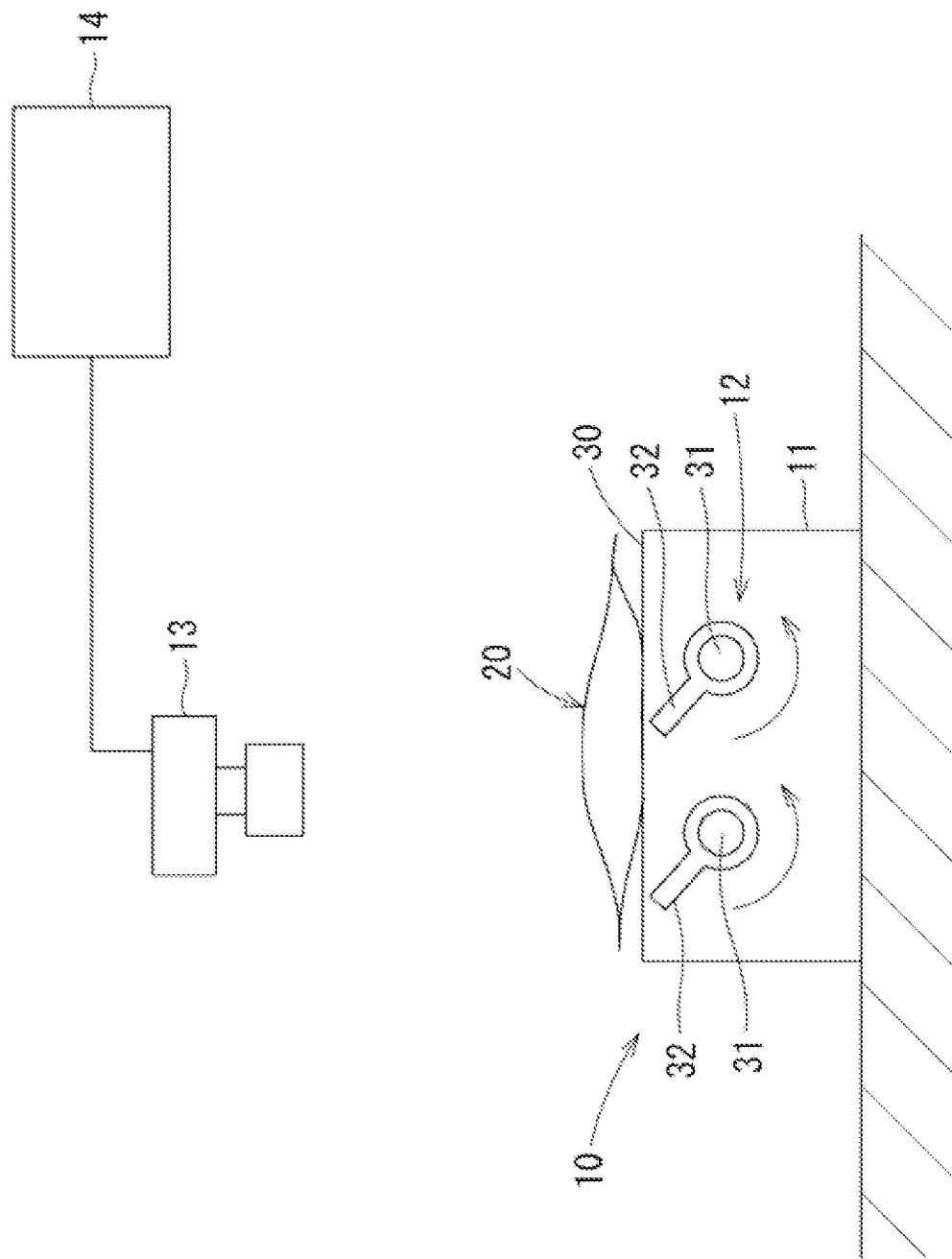
FIG. 2 is a schematic view of a foreign matter inspection system 10.

As illustrated in FIG. 2, the foreign matter inspection system 10 includes a support base 11, a vibration device 12, a photography device 13, and a determination device 14.

The support base 11 is a flat base on which the container 20 can be mounted on its upper surface 30. Hammers 32 of the vibration device 12 are located in a cavity at the center of the upper surface 30 of the support base 11. The upper surface 30 of the support base 11 supports a peripheral portion of the container 20. The container 20 is supported by the support base 11 so that the transparent area 22 faces upward. Although not illustrated, the support base 11 may be provided with a clip for fixing the container 20 or a suction port for sucking and fixing the container 20. Further, to make the support base 11 support the containers 20 sequentially, a transport device may be provided.

Below the upper surface 30 of the support base 11, the vibration device 12 is located. The vibration device 12 has rotating shafts 31 and the hammers 32 rotating in conjunction with the rotating shafts 31 and colliding with the container 20. In this embodiment, two rotating shafts 31 are located apart from each other in the left and right direction 7 along the forward and backward direction 6 (direction perpendicular to the sheet surface of FIG. 2). Each of the two rotating shafts 31 rotates by the transmission of rotation from a motor (not illustrated).

Two or more of the hammers 32 are fixed apart from each other in the forward and backward direction 6 with respect to one rotating shaft 31. The hammers 32 is formed of an elastic material, such as chlorinated butyl rubber, butyl rubber, and silicone rubber. Although in this embodiment, the plurality of hammers 32 fixed to one rotating shaft 31 project in the same direction from the rotating shaft 31, the directions in which the plurality of hammers 32 project from the rotating shaft 31 may be different. The shape of the hammer 32 is not particularly limited and may have such a shape that the hammer 32 can abut on the container 20 supported by the upper surface 30 of the support base 11 in a state where the hammer 32 projects substantially upward from the rotating shaft 31. The rotation of the rotating shaft 31 alternately generates timings when the hammers 32 abut on the container 20 and timings when the hammers 32 are separated from the container 20, and as a result, the hammers 32 strike the container 20. By the striking of the hammers 32 described above, a vibration is applied to the container 20.

The photography device 13 is located above the upper surface 30 of the support base 11. In other words, the photography device 13 is located on the opposite side to the vibration device 12 in the vertical direction 5, with the container 20 supported by the upper surface 30 of the support base 11 interposed between the vibration device 12 and the photography device 13. The photography device 13 optically photographs the inside of the container 20 through the transparent area 22 from the outside of the container 20, and is a monochrome CCD camera, for example. The photography device 13 outputs the photographed image as image data. The photography device 13 photographs 30 images per second, for example, and outputs the images as the image data.

The determination device 14 can receive the image data output from the photography device 13. The determination device 14 determines whether a foreign matter is present inside the container 20 based on the images of the container 20 photographed by the photography device 13, i.e., the image data. Specifically, the obtained one piece of image data is vertically and horizontally divided into a predetermined number of areas, and the color density of each area is identified in a plurality of stages. When the powder 21 is white, the foreign matter is recognized as black. Then, it is determined whether the foreign matter is present from a peak value (color density of foreign matter), an intensity volume value (height×width×color density of foreign matter), and an intensity area value (height×width of foreign matter) in the image data. For example, when all of the peak value, the intensity volume value, and the intensity area value are within predetermined conditions, e.g., when there is a predetermined continuous range where each value is equal to or higher than a threshold value, the determination device 14 determines that the foreign matter is present in the container 20.

[Foreign Matter Inspection Method]

Hereinafter, a foreign matter inspection method using the foreign matter inspection system 10 will be described.

Figure 3:
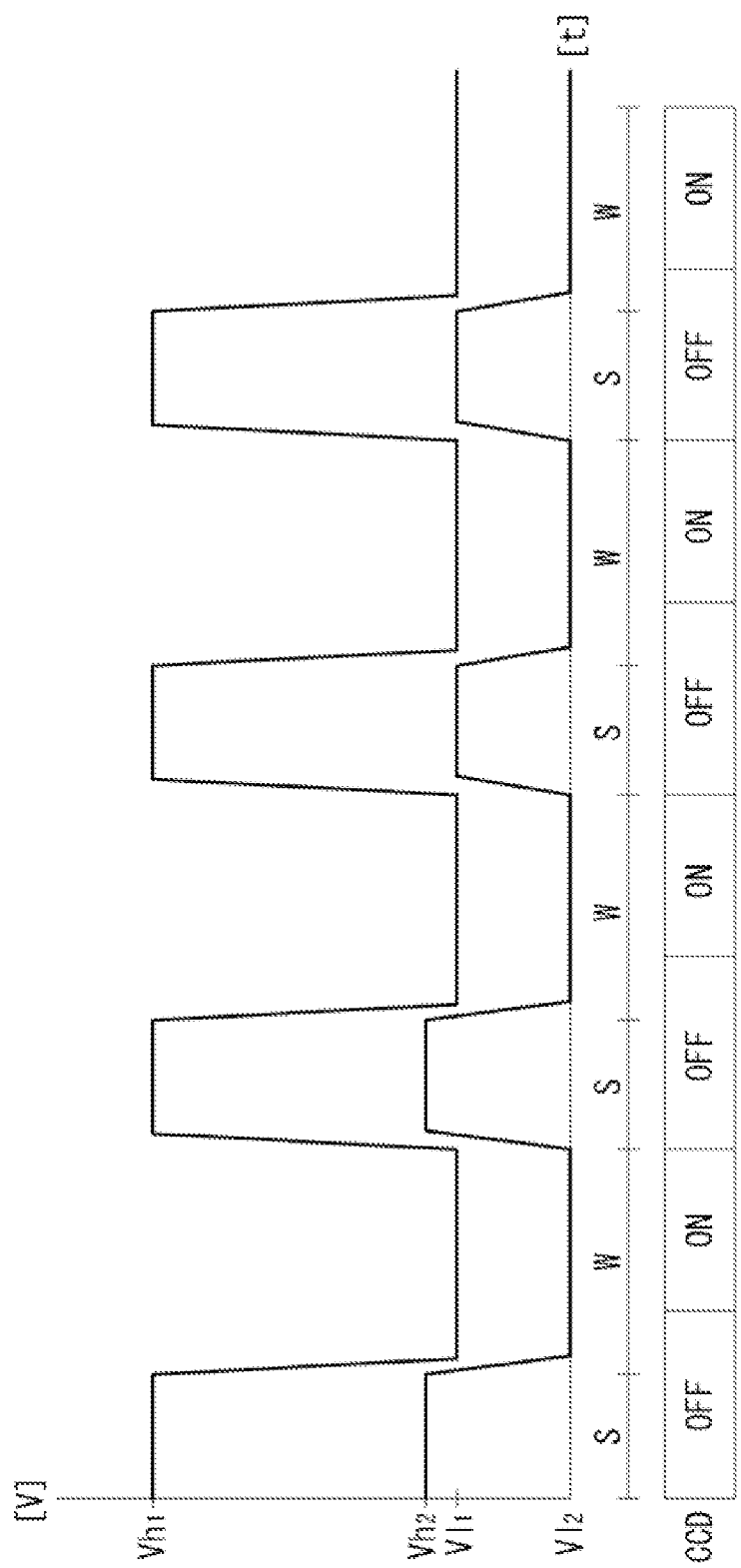
FIG. 3 is a timing chart illustrating strong vibrations S, weak vibrations W, and photographing timings of a photography device 13.

First, the container 20 to be inspected is placed and fixed on the upper surface 30 of the support base 11. Then, the vibration device 12 alternately applies a weak vibration and a strong vibration being a vibration stronger than the weak vibration to the container 20. When described in detail, voltages Vh1 and Vh2 are individually applied to the two rotating shafts 31 in a strong vibration S as illustrated in FIG. 3. In this embodiment, although the voltage Vh1 and the voltage Vh2 are different voltages, they may not be necessarily different. The strong vibration S is, for example, 0.5 G to 3.0 G and the weak vibration W is, for example, 0.2 G to 0.6 G. In a weak vibration W, voltages Vl1 and Vl2 are individually applied to the two rotating shafts 31. The voltage Vl1 is a voltage lower than the voltage Vh1. The voltage Vl2 is a voltage lower than the voltage Vh2. Thus, the number of rotations of each rotating shaft 31 is higher in the strong vibration S than in the weak vibration W.

The strong vibration S and the weak vibration W each are alternately applied four times to the container 20. In this embodiment, although a period of time while the strong vibration S continues is shorter than a period of time while the weak vibration S continues, the period of time and the number of times where the strong vibration S and the weak vibration W continue can be changed as appropriate.

As illustrated in FIG. 3, the photography device 13 photographs images of the container 20 during a period from when a predetermined time T has elapsed after the strong vibration S is switched to the weak vibration W until when the weak vibration W is switched to the strong vibration S next time. More specifically, the images of the container 20 are photographed in each of four weak vibrations W. In FIG. 3, an area indicated as ON is the time when the photography device 13 photographs the images, and an area indicated as OFF is the time when the photography device 13 does not photograph images.

The determination device 14 determines whether the foreign matter is present inside the container 20 based on the images of the container 20 photographed by the photography device 13 when the vibration device 12 applies the weak vibrations W. The photography device 13 may photograph images both in the strong vibrations S and in the weak vibration W, and the determination device 14 may adopt image data photographed by the photography device 13 in the weak vibrations W as image data to be determined.

[Operational Effects of this Embodiment]

According to this embodiment, by applying the strong vibration S to the container 20, the foreign matter buried inside the powder 21 is caused to appear so that the foreign matter can be photographed. By applying the weak vibration W to the container 20, a crack generated by the strong vibrations S in the powder 21 is eliminated, the powder 21 is less likely to be cracked, and the appearing foreign matter is less likely to disappear. By determining whether the foreign matter other than the powder 21 is present inside the container 20 based on the image obtained in the weak vibration W, the determination accuracy of the foreign matter is improved.

DESCRIPTION OF REFERENCE NUMERALS

10 foreign matter inspection system
12 vibration device
13 photography device
14 determination device
20 container
21 powder
22 transparent area (area)

The invention claimed is:

1. A foreign matter inspection system inspecting whether a foreign matter is present inside a bag-like container in which a powder is sealed and which has an area where the powder is visible from an outside, the foreign matter inspection system comprising:
    a vibration device configured to alternately apply a weak vibration and a strong vibration to the container, the strong vibration being a vibration stronger than the weak vibration; and
    a photography device configured to optically photograph an inside of the container through the area from the outside when the vibration device applies the weak vibration to generate images of the container;
    wherein an image of the container, photographed by the photography device when the vibration device applies the weak vibration, is used to determine whether foreign matter is present inside the container;
    wherein each image of the area photographed comprises a plurality of image sub-areas of image data, the image data indicative of color density; and
    wherein foreign matter is present when all of a peak color density value, an intensity volume value, and an intensity area value, derived from the image data for a continuous range of sub-areas, are at least as great as a respective threshold.

2. The foreign matter inspection system according to claim 1, wherein the vibration device includes a rotating shaft and a hammer rotating in conjunction with the rotating shaft and colliding with the container, and is located on an opposite side to the photography device with the container interposed between the vibration device and the photography device.

3. The foreign matter inspection system according to claim 2, wherein the vibration device makes a number of rotations of the rotating shaft in the strong vibration higher than a number of rotations of the rotating shaft in the weak vibration.

4. The foreign matter inspection system according to claim 1, wherein the powder is a pharmaceutical agent.

5. The foreign matter inspection system according to claim 1, wherein image data obtained only when the vibration device applies the weak vibration is used to determine whether foreign matter is present inside the container.

6. The foreign matter inspection system according to claim 5, wherein
    the photography device is configured to optically photograph an inside of the container to generate images of the container only when the vibration device applies the weak vibration.

7. A foreign matter inspection method for inspecting whether a foreign matter is present inside a bag-like container in which a powder is sealed and which has an area where the powder is visible from an outside, the method comprising:
    alternately applying a weak vibration and a strong vibration being a vibration stronger than the weak vibration to the container;
    photographing an image including the area of the container to acquire image data when the weak vibration is applied;

grouping the acquired image data according to sub-areas of the area;

for each sub-area determining a peak color density value, an intensity volume value, and an intensity area value; and determining whether the foreign matter is present inside the container based on the acquired image data, wherein said determining whether foreign matter is present determines that foreign matter is present when there is a continuous range for which each one of the peak color density value, intensity volume value, and intensity area value are at least as great as a respective threshold.

8. The foreign matter inspection method according to claim 7, wherein said determining whether the foreign matter is present inside the container is based on the image data acquired only during the weak vibration.

9. The foreign matter inspection method according to claim 8, wherein said photographing the area of the container to acquire image data is performed only when the weak vibration is applied.

\* \* \* \* \*